Nov. 10, 1925.                                                    1,561,310
R. D. CORKE
PACKING RING
Filed March 26, 1923
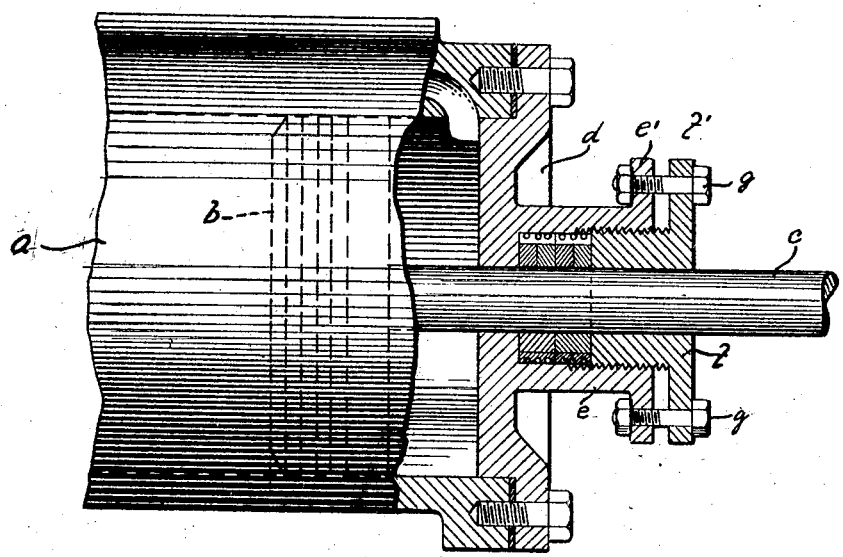
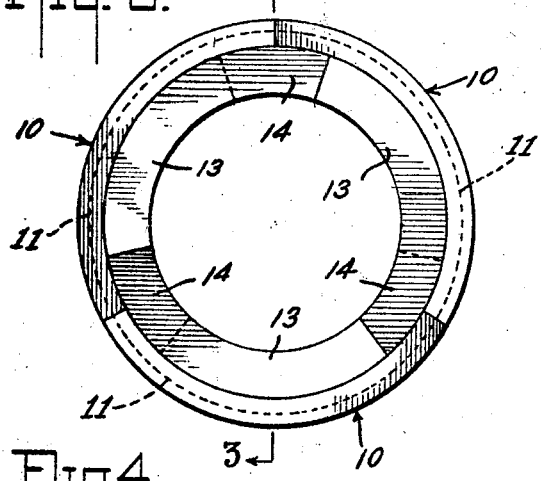
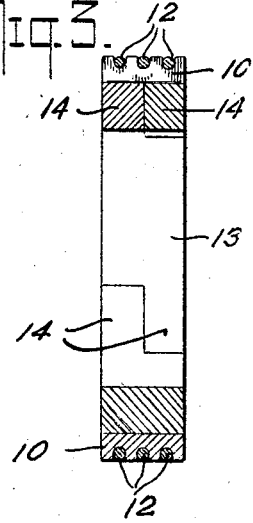
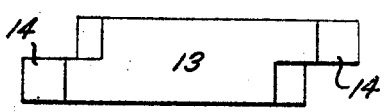
Inventor
RULOFF D. CORKE.
By his Attorney Patented Nov. 10, 1925.

1,561,310

UNITED STATES PATENT OFFICE.

RULOFF D. CORKE, OF YONKERS, NEW YORK.

PACKING RING.

Application filed March 26, 1923. Serial No. 627,612.

*To all whom it may concern:*

Be it known that I, RULOFF D. CORKE, a citizen of the United States, and a resident of Yonkers, in the county of Westchester and State of New York, have invented certain new and useful Improvements in Packing Rings, of which the following is a full, clear, and exact description.

This invention relates to certain improvements in packing generally, and more particularly to a self lubricating packing adapted for use in the manufacture of packing rings for steam engines, steam turbines, air compressors, water and oil pumps or the like.

The principal object of the invention is to provide for a packing ring construction from a self-lubricating material, such as the graphite-metal alloy, now to be purchased on the market under the trade-name of "Graphalloy," which is made by forcing molten metal into the pores of graphite blocks or rods under high pressure, and afterward machined to desired form of packing ring, or for use as a self-lubricating lining for packing rings otherwise constructed wholly from metal.

Another object of the invention is to provide for a packing ring construction as characterized, and one wherein the ring, or the lining of a metal ring, made from the self-lubricating material aforesaid, is preferably formed of a plurality of semi-circular segments which will provide a ringlike body of true circular formation, when assembled together in end to end abutting relation one segment with respect to the other, and each segment will preferably have its opposite ends so formed as to provide portions to overlap the complemental end portions of adjacent segments, whereby to facilitate the assembly of the packing ring body in its operative position.

A further object of the invention is to provide for a packing ring of the type set forth, and one which will be highly efficient in use, easy to assemble and install in operative position, long lived by reason of its structual makeup and its self-lubrication, and, in its segmented form, capable of having worn parts thereof readily replaced with new parts without the renewing or substitution therefor of an entire new ring or ring lining.

With the foregoing and other equally important objects in view, the invention resides in the certain new and useful construction and arrangement as will be hereinafter more fully described, set forth in the appended claim, and illustrated in the accompanying drawing, in which:—

Figure 1 is a fragmentary elevation, partly in section, of a piston and cylinder construction of conventional form, and showing an application of the invention thereto, Figure 2 is an end view of a preferred form of the packing ring construction, Figure 3 is a transverse section taken on the line 3—3 of Figure 2, and, Figure 4 is a side elevation of one of the segmental sections of the packing ring or lining therefor.

Referring to the drawing, and more particularly to Figures 2 to 4 thereof, the embodiment of the invention as shown therein, comprises an outer all-metal ring, as, for instance, of brass or the like, and preferably made up of a plurality of segments 10 placed in end to end abutting relation to provide an annular body of true circular formation. Formed circumferentially of the metal ring thus provided, are a plurality of equidistantly spaced grooves 11 for the reception of binding members or wires 12, whereby the several segments 10 are maintained in true circular assembly.

Lining the inner periphery of the outer ring formation is a ring-shaped body formed of a suitable self-lubricating material, such as "Graphalloy" or the like made in accordance with the process and product disclosed and covered by United States Patents Nos. 1,053,880 and 1,053,881, both dated February 18, 1913, and other patents pending, and this body is preferably made up of a plurality of semi-circular segments 13 having their abutted ends cut away to provide overlapping end portions 14, substantially as shown. By thus making both the outer, all-metal ring body and the inner lining ring body in their respective segmental forms, a much closer union between the abutting ends and contracting surfaces of the several segments 10 and 13 thereof, respectively, will be effected than would be the case of merely assembling one integral ring body within the other, since the binding wires 12 act not only in a circumferential direction tending to force the opposed ends of the segments of both ring bodies tightly together, but also in the direction diametrically to contract the same so that their opposed peripheral surfaces are also forced together in a similar manner.

As an instance of the use of the packing rings constructed and arranged in accordance with the present invention, and reference is now made to Figure 1, wherein $a$ denotes the cylinder of a compressor, engine or pump, having a piston $b$ mounted therein and secured on the inner end of a piston rod $c$ extending outwardly from one end of the cylinder $a$, through the removable head block or plate $d$ thereof, for the transmitting of reciprocatory movement to or from the piston, as the case may be. Formed concentrically of the outer side of the head block or plate $d$, and surrounding an intermediate portion of the piston rod $c$, is a packing box $e$, which is threaded internally and inwardly of its outer end to receive a packing compression nut or plug $f$. Now, when several of the packing rings are engaged over the piston rod $c$ and positioned inwardly of the packing box $e$, the nut or plug $f$ will be screwed inwardly of the threaded end of the latter to maintain the packing rings in their operative positions, one abutting the other, when the same will efficiently act to prevent escape of compression or leakage of the gaseous or liquid content of the cylinder $a$ outwardly of the piston rod opening in the head block or plate $d$, as in the usual manner of such constructions, but, in the present instance, the packing rings or ring segments 13 will also function to lubricate the piston rod $c$ in its reciprocating movements therethrough. The annular bore of the stuffing box or gland $e$ is preferably of a slightly greater diameter than that of the packing rings, and the screw nut or plug $f$ is threaded inwardly of the bore, whereby to admit of a slight play of the rings between the inner end of the same and the opposed end wall of the box or gland, all in a manner to provide a clearance so that the packing rings will have a limited motion or play responsive to the movements of the piston rod $c$ therethrough and will adjust themselves correspondingly for any inaccuracies of alignment of the latter without in any way reducing their effectiveness of function with respect thereto. As shown, the outer ends of the packing box $e$ and the nut or plug $f$ may be flanged as at $e'$ and $f'$, respectively, to receive the fastenings $g$, whereby to secure the nut or plug $f$ in its packing compression position and to otherwise prevent the accidental loosening up of the same during the operating of the piston rod $c$ therethrough.

If desired, the inner graphalloy segments 13 may be secured to the outer metal segments 10, as for instance, by means of dowel pins or lugs (not shown) which may be formed with certain of the segments for engagement in openings provided in the others thereof for the purpose, or the same may be separately formed and engaged through registering openings or recesses formed in the complemental of the inner and outer set of segments.

From the foregoing, it will be readily apparent that, while a preferred embodiment of the packing ring has been described and illustrated herein in specific terms and details of materials, and the construction and arrangement of the parts thereof, various changes in and modifications of the same may be resorted to without departing from the spirit of the invention, or the scope of the claim appended hereto.

Having thus fully described the invention, what is claimed, is:—

A packing ring comprising an outer ring member formed of a plurality of segments arranged in end to end abutting relation and provided with circumferentially disposed grooves on their peripheries, an inner ring member formed of a plurality of segments formed for overlapping end to end engagement, the segments of said inner ring member comprising graphite blocks impregnated with molten metal and machined into the desired form, and straight wire binding members disposed in the grooves of said outer ring member for binding all of said ring members in assembled relation whereby to impart radial as well as circumferential pressure to the interior of said ring when assembled.

RULOFF D. CORKE.